United States Patent
Jung (10) Patent No.: US 9,834,189 B2
(45) Date of Patent: Dec. 5, 2017

(54) ELECTRO-HYDRAULIC BRAKE SYSTEM INCLUDING ISOLATED CIRCUITS AND METHOD OF CONTROLLING THE SAME

(71) Applicant: Hyundai Motor Company, Seoul (KR)

(72) Inventor: Young Suk Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 73 days.

(21) Appl. No.: 14/951,452

(22) Filed: Nov. 24, 2015

(65) Prior Publication Data

US 2016/0375886 A1 Dec. 29, 2016

(51) Int. Cl.
| | | |
|---|---|---|
| *B60T 8/40* | (2006.01) | |
| *B60T 13/68* | (2006.01) | |
| *B60T 7/04* | (2006.01) | |
| *B60T 13/16* | (2006.01) | |
| *B60T 13/66* | (2006.01) | |
| *B60T 13/74* | (2006.01) | |

(52) U.S. Cl.
CPC ............ *B60T 8/4081* (2013.01); *B60T 7/042* (2013.01); *B60T 13/166* (2013.01); *B60T 13/662* (2013.01); *B60T 13/686* (2013.01); *B60T 13/745* (2013.01)

(58) Field of Classification Search
CPC .... B60T 8/4081; B60T 8/4018; B60T 13/686; B60T 13/745; B60T 7/042; B60T 7/06; B60T 13/166; B60T 13/662
See application file for complete search history.

(56) References Cited

U.S. PATENT DOCUMENTS

| | | | | |
|---|---|---|---|---|
| 5,609,399 | A * | 3/1997 | Feigel | B60T 8/3265 188/162 |
| 6,315,370 | B1 * | 11/2001 | Feigel | B60T 7/042 303/113.4 |
| 2004/0207252 | A1 | 10/2004 | Woll | |
| 2013/0214587 | A1 * | 8/2013 | Yang | B60T 13/686 303/6.01 |

FOREIGN PATENT DOCUMENTS

| | | |
|---|---|---|
| JP | 7-9982 A | 1/1995 |
| JP | 2006-7874 A | 1/2006 |
| JP | 2008-222029 A | 9/2008 |
| KR | 0146226 B1 | 5/1998 |

(Continued)

*Primary Examiner* — Melanie Torres Williams
(74) *Attorney, Agent, or Firm* — Morgan, Lewis & Bockius LLP (57) ABSTRACT

Disclosed are electro-hydraulic brake system and control method. The system may include a braking input unit to provide a braking input according to an operation of a driver, a control unit to control generation of braking oil pressure according to the braking input of the braking input unit, a pressure generating unit to generate the braking oil pressure, wheel clamping units to generate braking forces to corresponding wheels, and oil supply lines to transfer the braking oil pressure to corresponding wheel clamping units. Each oil supply line is fluidly connected to the pressure generating unit. For each oil supply line, a split valve is installed in a connection portion of the pressure generating unit and the oil supply line. When the split valve is closed, the split valve blocks the braking oil pressure supplied from the pressure generating unit to the oil supply line.

10 Claims, 6 Drawing Sheets

(56) References Cited

FOREIGN PATENT DOCUMENTS

| KR | 1999-0029726 U | 7/1999 |
|---|---|---|
| KR | 2003-0085853 A | 11/2003 |
| KR | 10-2007-0104982 A | 10/2007 |
| KR | 10-2014-0134570 A | 11/2014 |
| KR | 10-2014-0135043 A | 11/2014 |
| KR | 10-2014-0140404 A | 12/2014 |

\* cited by examiner

NORMAL OPERATION

FIG. 1

(Related Art)

EUC HAS FAILURE

FIG. 2

(Related Art)

OIL LEAKS IN CIRCUIT

FIG. 3

(Related Art)

ELECTRO-HYDRAULIC BRAKE SYSTEM
INCLUDING ISOLATED CIRCUITS AND
METHOD OF CONTROLLING THE SAME

CROSS-REFERENCE TO RELATED
APPLICATION

The present application claims priority of Korean Patent Application Number 10-2015-0089025 filed Jun. 23, 2015, the entire contents of which application are incorporated herein for all purposes by this reference

BACKGROUND

Technical Field

The present disclosure relates to an electro-hydraulic brake system and a method of controlling the same. More particularly, it relates to an electro-hydraulic brake system, which generates required oil pressure with a motor according to braking performed by a driver and transmits the generated oil pressure to a wheel brake, and a method of controlling the same.

Background Art

Recently, a brake-by-wire technology adopting an electronic control system for control has been applied to a brake system of a vehicle, instead of an existing known general hydraulic control system.

The electronic control brake system generates required oil pressure by using an electric motor according to braking performed by a driver, and transmits the oil pressure generated by driving the motor to a wheel brake (wheel cylinder) of each vehicle wheel to generate braking force.

The electronic control brake system controlling oil pressure with an electronic actuator is generally referred to as an electro-hydraulic brake (EHB) system.

The EHB system easily and individually controls braking force generated by each wheel, and thus it is possible to easily implement a function, such as an electronic stability control (ESC) or an anti-lock brake system (ABS) function.

In a typical EHB system, a pump, which converts rotating force into linear force when a motor is driven to move a piston in front and rear directions, and forms oil pressure by the piston pressurizing braking oil within a chamber of a cylinder, has been widely used as the electronic actuator.

The EHB system detects pedal stroke according to a pedal operation of a driver through a sensor, and then controls braking force of each wheel with oil pressure generated by the pump by driving the motor.

The EHB system is provided with a pedal simulator enabling a driver to feel pedal pressure similar to that of a general hydraulic brake system.

Accordingly, when a driver steps on and pressurizes a pedal connected to a backup master cylinder, pressure of braking oil inside the backup master cylinder is increased, and oil pressure of the backup master cylinder is transferred to the pedal simulator through a pedal hydraulic line to generate a pedal feel.

When a driver steps on a brake pedal, a control unit calculates target oil pressure desired by the driver based on a driver pedal input value (braking input value), that is, a pedal stroke value, detected through a brake pedal sensor (pedal stroke sensor), and then makes a pump generate oil pressure by controlling driving of the motor according to the calculated target oil pressure, thereby transferring the oil pressure generated by the pump to each wheel cylinder and obtaining desired braking force.

Figure 1:
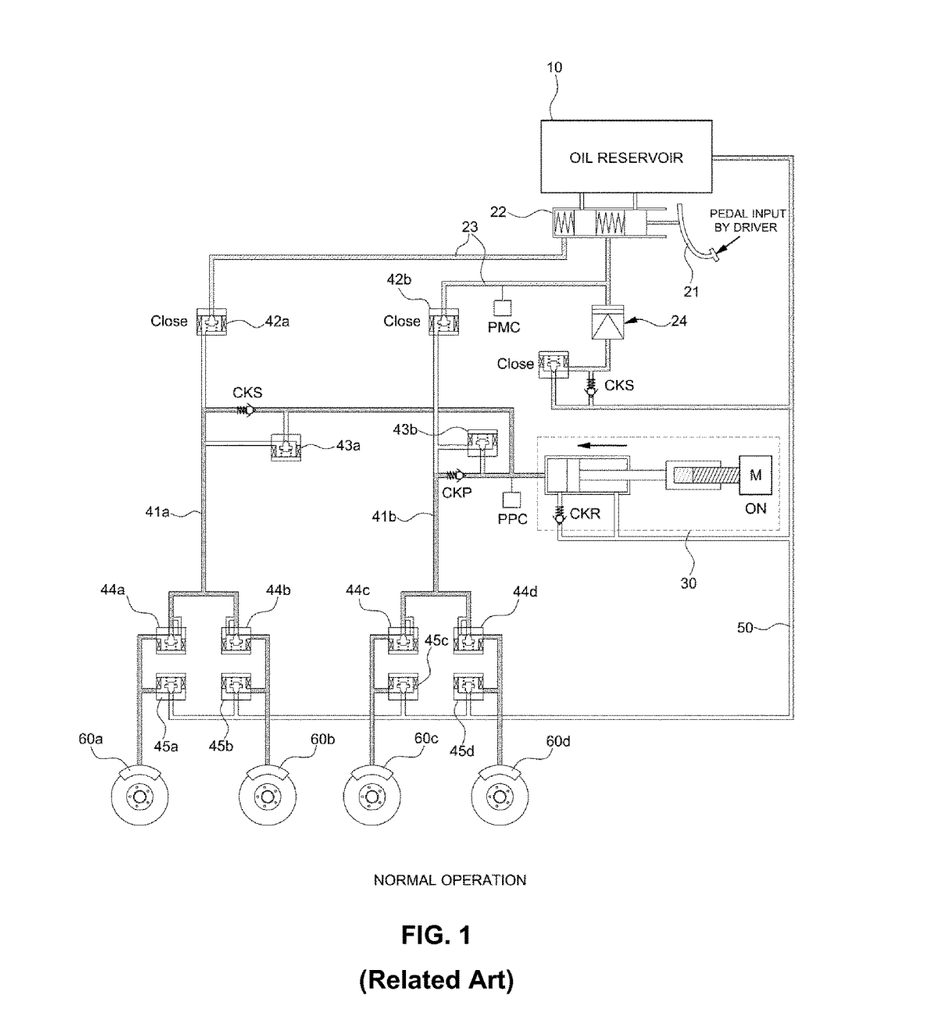
FIG. 1, FIG. 2 and FIG. 3 illustrate different operation states of an electro-hydraulic brake (EHB) system in the related art.
Figure 2:
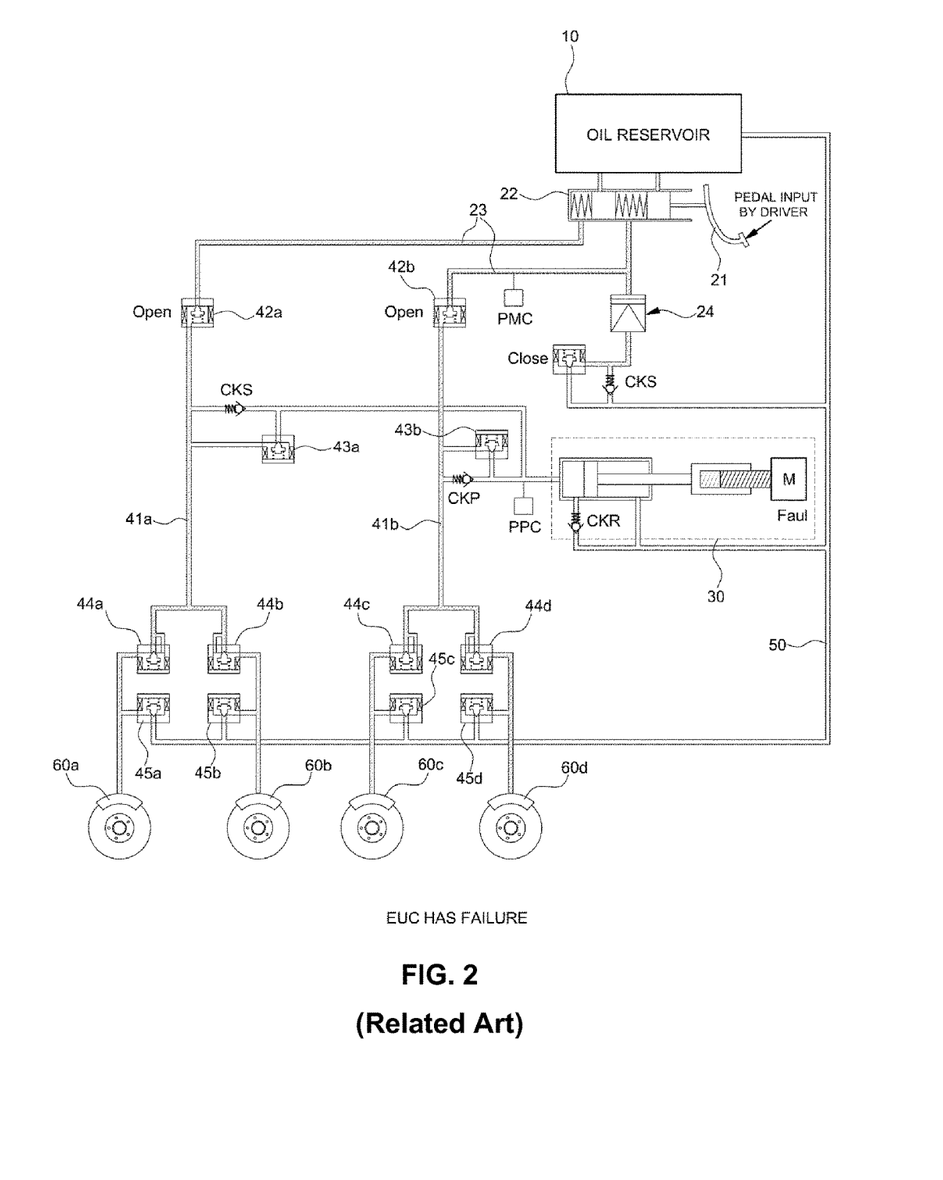
Figure 3:
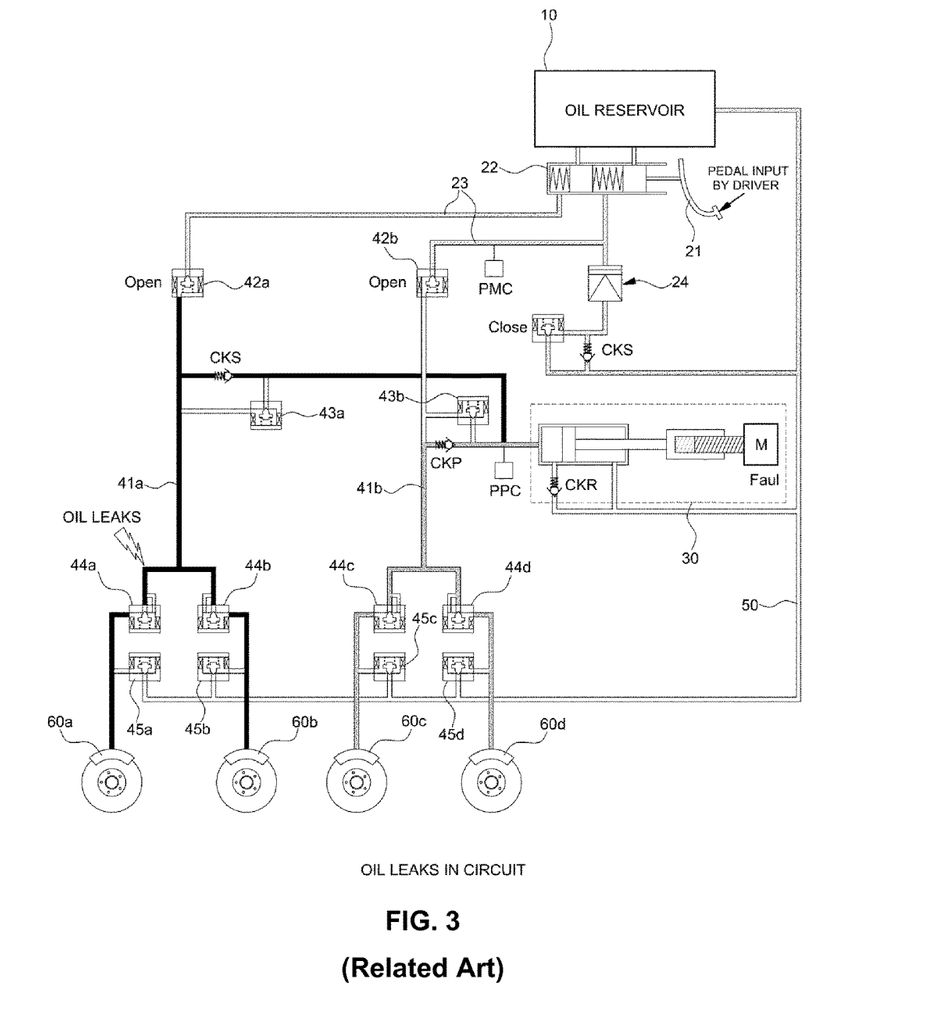

FIGS. 1 to 3 illustrate an example of an EHB system in the related art.

As illustrated in FIG. 1, the EHB system in the related art includes a brake pedal 21 that is an input means for a brake will of a driver, a backup master cylinder 22 connected to the brake pedal, a pedal simulator 24 connected to the backup master cylinder 22 in order to provide an appropriate pedal feel, and an oil reservoir 10 for storing braking oil.

The backup master cylinder is connected to circuits for forming braking oil pressure to each wheel through cut valves 42a and 42b that are normally open valves, and provides oil pressure of the backup master cylinder as braking oil pressure of each wheel depending on a case. Further, the circuits are connected to a pressure generating unit 30 including a motor, and oil pressure formed through the pressure generating unit 30 is transferred to each of wheel clamping units 60a, 60b, 60c, and 60d, thereby providing braking force to each wheel.

Inlet valves 44a, 44b, 44c, and 44d are installed at distal ends of the circuits, respectively, so that oil supply lines 41a and 41b to each wheel are formed. Further, an oil return line 50 for returning oil to the oil reservoir when the ABS is operated is formed, and the oil return line is connected to the oil reservoir 10 by outlet valves 45a, 45b, 45c, and 45d.

In the meantime, FIGS. 1 to 3 illustrate different operation states, respectively. Particularly, FIG. 1 illustrates a case where oil pressure is formed during a normal operation, FIG. 2 illustrates a case where an electronic control unit (ECU) has a failure, and FIG. 3 illustrates a case where oil leaks in some circuits.

As illustrated in FIG. 1, during a normal operation, all of the cut valves 42a and 42b are closed, so that a pedal feel is formed by the pedal simulator 24. In this case, oil pressure within each circuit is increased by the motor and braking oil pressure is provided to each wheel.

In the meantime, FIG. 2 illustrates a case where braking is performed in a situation, such as a situation in which the ECU has a failure, and when the ECU has a failure, it is impossible to control the motor, so that the cut valves 42a and 42b are opened, and a hydraulic line is formed so that the braking is performed by using an pedal effort according to step-on of the brake pedal by a driver.

FIG. 3 illustrates a state where oil leaks in a part of the circuits (a left circuit in FIG. 3). When oil leaks in a circuit as illustrated in FIG. 3, and the control unit detects the oil leakage, the control unit stops the operation of the pressure generating unit 30, and controls so that the hydraulic line is formed as illustrated in FIG. 2.

In the meantime, when oil leaks in the circuit and the control unit fails to detect the oil leakage, the pressure generating unit 30 is continuously operated according to a braking input of the brake pedal. Oil within each circuit returns to the oil reservoir 10 through the oil return line 50, and then oil of both circuits is joined again. Accordingly, when the pressure generating unit 30 is continuously operated, there is a problem in that an oil quantity required for braking is insufficient due to continuous oil leakage at a leak point.

An oil quantity for operating the motor is insufficient due to the continuous oil leakage, and the oil of the oil reservoir 10 is sucked through the oil return line 50, so that the pressure generating unit cannot operate the motor, thereby failing to sufficiently provide braking force. That is, even though the control unit detects that it is impossible to operate the motor, switches an operation mode into an oil leakage detection mode, and performs braking only with the backup master cylinder by opening the cut valves, an oil quantity capable of performing braking eventually becomes insufficient, so that it is impossible to perform braking. Further, braking force is formed only with a pedal effort of a driver, so that a problem in safety, such as an increase of a braking distance, is caused.

The information disclosed in this Background section is only for enhancement of understanding of the general background of the invention and should not be taken as an acknowledgement or any form of suggestion that this information forms the prior art already known to a person skilled in the art.

SUMMARY OF THE DISCLOSURE

The present invention has been made in an effort to solve the above-described problems associated with the prior art and/or other problems.

The present invention guarantees braking stability of an electro-hydraulic brake system even if leakage is generated in a circuit of the electro-hydraulic brake system and oil leaks.

In one aspect, the present invention provides an electro-hydraulic brake system including isolated circuits, including: a braking input unit configured to provide a braking input according to an operation of a driver; a control unit configured to control generation of braking oil pressure according to the braking input of the braking input unit; a pressure generating unit configured to generate the braking oil pressure and controlled by the control unit; wheel clamping units configured to generate braking forces to corresponding wheels; and two or more oil supply lines configured to transfer the braking oil pressure generated according to the braking input of the braking input unit to corresponding wheel clamping units, wherein each oil supply line is fluidly connected to the pressure generating unit, and wherein for each oil supply line, a split valve is installed in a connection portion of the pressure generating unit and the oil supply line, and when the split valve is closed, the split valve blocks the braking oil pressure supplied from the pressure generating unit to the oil supply line.

In a preferred embodiment, the electro-hydraulic brake system may further include an oil reservoir configured to store braking oil, and connected to the oil supply lines to provide the braking oil to the oil supply lines.

In another preferred embodiment, the electro-hydraulic brake system may further include: one or more first partition walls formed inside the oil reservoir to divide the oil reservoir into regions corresponding to the number of the oil supply lines; and two or more second partition walls to divide the regions of the oil reservoir into re-divided regions, wherein the re-divided regions are connected to the oil supply lines and oil return lines.

In still another preferred embodiment, the electro-hydraulic brake system may further include two or more oil return lines branched from the corresponding oil supply lines, and connected with the oil reservoir to return the braking oil to the oil reservoir, wherein the oil return lines are isolated from each other.

In yet another preferred embodiment, a respective inlet valve for blocking the supplied braking oil pressure may be installed between a corresponding oil supply line and a corresponding wheel clamping unit, and a respective outlet valve for releasing the braking oil pressure may be installed between a corresponding oil return line and the corresponding wheel clamping unit.

In still yet another preferred embodiment, the control unit may detect whether oil leakage occurs within a circuit including the corresponding oil supply line, and control to close the split valve installed in the connection portion of the pressure generating unit and the corresponding oil supply line, if the oil leakage occurs within the circuit.

In a further preferred embodiment, the pressure generating unit may include: a motor, of which driving is controlled according to a control signal of the control unit; and a piston configured to pressurize the braking oil within a cylinder by using rotating force of the motor.

In another further preferred embodiment, for each oil supply line, a cut valve that is a normally open valve may be installed at a braking input unit side of the oil supply line.

In still another further preferred embodiment, the control unit may detect whether the pressure generating unit has a failure, and when the failure of the pressure generating unit is detected, the control unit may control all of the split valves to be closed in a state where the cut valve is opened.

In another aspect, the present invention provides a method of controlling an electro-hydraulic brake system including isolated circuits, wherein the electro-hydraulic brake system comprises two or more circuits for supplying braking oil pressure to wheel clamping units and releasing the braking oil pressure, and two or more split valves installed to block the braking oil pressure supplied from a pressure generating unit to corresponding circuits, the method including: detecting whether oil leakage occurs in a circuit in the two or more circuits; controlling, by a control unit, a corresponding split valve connecting the circuit, in which the oil leakage occurs, and the pressure generating unit to be closed when the oil leakage of the circuit is detected; and supplying the braking oil pressure generated by the pressure generating unit to the wheel clamping units through the remaining circuit or circuits in which the remaining split valve or split valves are open.

In a preferred embodiment, the method may further include: detecting whether the pressure generating unit has a failure; and when it is detected that the pressure generating unit has the failure, closing, by the control unit, all of the split valves According to the present invention, it is possible to completely isolate a plurality of circuits constituting the electro-hydraulic brake system, so that even when oil leaks in some circuits, it is possible to sufficiently secure an oil quantity enabling braking in the case of an emergency by preventing oil of the respective circuits from being mixed.

Accordingly, it is possible to sufficiently secure braking force and a braking distance by the normally operated isolated circuit and a pressure generating unit including the motor, thereby securing braking stability when leakage is generated.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Reference numerals set forth in the Drawings includes reference to the following elements as further discussed below.

| | |
|---|---|
| 110: oil reservoir | 111: first partition wall |
| 112a, 112b: second partition wall | 121: brake pedal |
| 122: backup master cylinder | 123: pedal hydraulic line |
| 124: pedal simulator | 130: pressure generating unit |
| 132: motor | 134: piston |
| 135: cylinder | 141a, 141b: oil supply line |
| 142a, 142b: cut valve | 143a, 143b: release valve |
| 144a, 144b: split valve | 145a, 145b, 145c, 145d: inlet valve |
| 146a, 146b, 146c, 146d: outlet valve | |
| 150a, 150b: oil return line | |
| 160a, 160b, 160c, 160d: wheel clamping unit | |
| 170: control unit | 180a, 180b: pressure sensor |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to an electro-hydraulic brake (EHB) system, and is a technology applicable to an EHB system capable of collectively implementing a general braking function and functions such as an anti-brake system (ABS) function and an electronic stability control (ESC).

Particularly, an EHB system including isolated circuits and a method of controlling the same according to the present invention are characterized by adopting a structure, in which an ABS pressure release flow path is isolated, and split valves for separating a motor from respective circuits are added, so that the respective circuits are completely isolated or separated.

The EHB system including isolated circuits and the method of controlling the same according to the present invention is also characterized in that an isolated oil return line is formed for each circuit, and reservoir partition walls are formed so as to divide an oil reservoir into an oil return side and an oil supply side.

In the exemplary embodiment of the present invention, a case where two circuits connected to a front wheel and a rear wheel, respectively, in a form of an X-circuit are included is exemplified as the EHB system, but it is noted that it shall not be construed that the present invention is limited to the suggested example, and it shall be construed that the present invention includes a case where the number of circuits can be increased to two or more.

A configuration of the drawing suggested as an exemplary embodiment of the present invention is simply one example, and it shall be construed that the present invention includes various exemplary embodiments capable of configuring isolated circuits. Particularly, those skilled in the art may easily understand that suggested hydraulic lines and valves may be appropriately changed in design according to specifications thereof.

Hereinafter, the EHB system including isolated circuits and the method of controlling the same according to the exemplary embodiment of the present invention will be described in detail with reference to the accompanying drawings.

Figure 4:
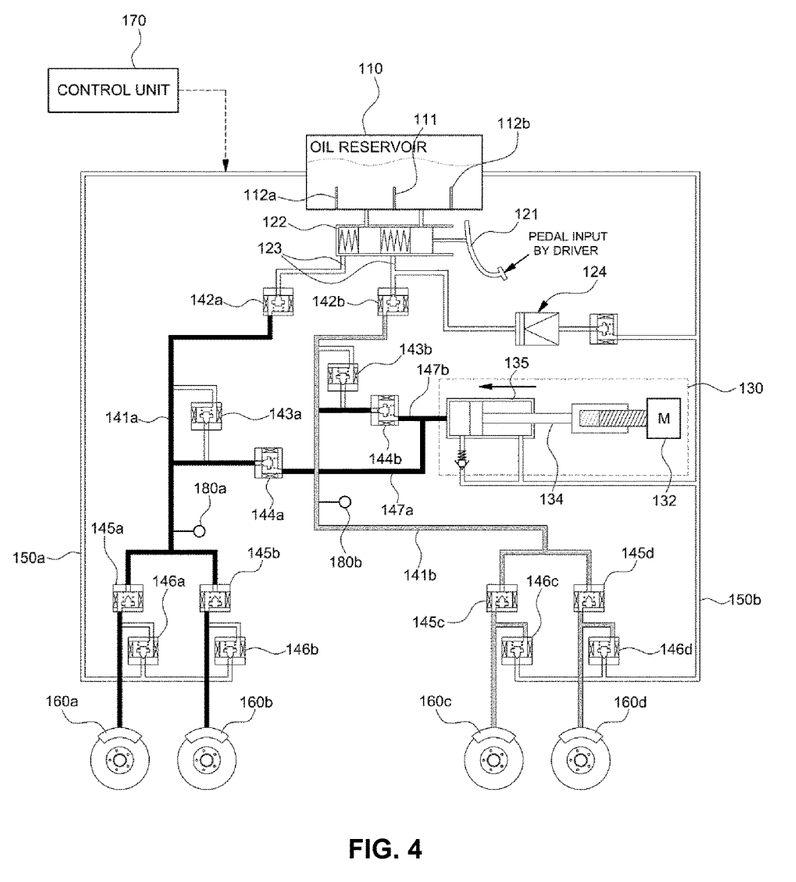
FIG. 4 is a configuration diagram illustrating an EHB system including isolated circuits according to an exemplary embodiment of the present invention.
Figure 5:
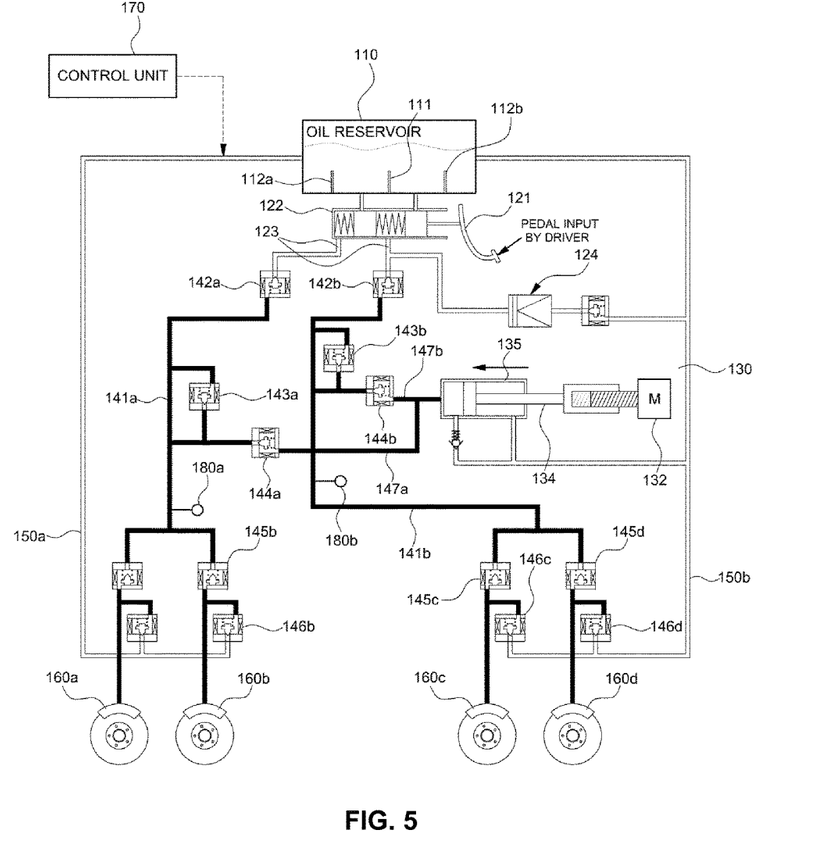
FIG. 5 illustrates a normal operation state of the EHB system according to the exemplary embodiment of FIG. 4.
Figure 6:
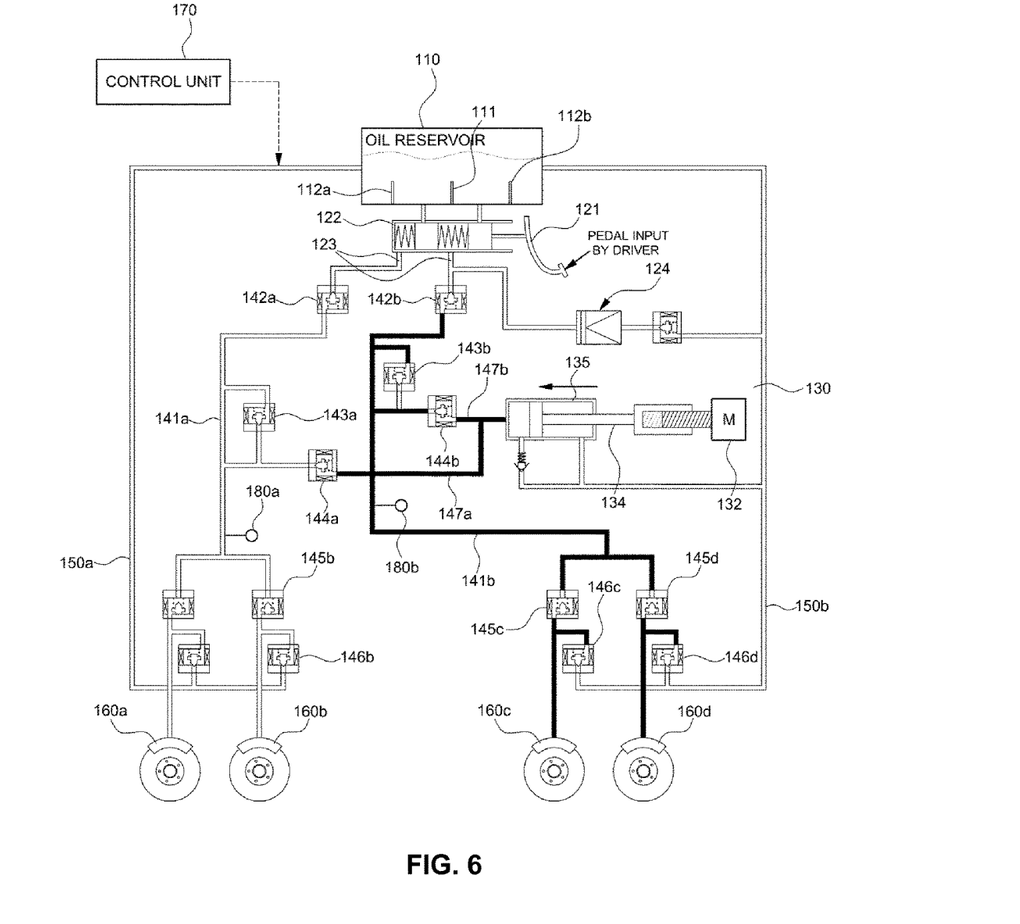
FIG. 6 illustrates an operation state when oil leaks in one circuit of the EHB system according to the exemplary embodiment of FIG. 4.

FIG. 4 is a configuration diagram illustrating an EHB system including isolated circuits according to an exemplary embodiment of the present invention, and FIGS. 5 and 6 illustrate operation states of the EHB system according to the exemplary embodiment of FIG. 4.

First, an EHB system including isolated circuits according to an exemplary embodiment of the present invention will be described with reference to FIG. 4 below.

The EHB system including isolated circuits according to the exemplary embodiment of the present invention includes a brake pedal 121 that is a braking input unit operated for braking a vehicle by a driver, a pressure generating unit 130 for generating braking oil pressure, and wheel clamping units 160a, 160b, 160c, and 160d for generating braking force to wheels, respectively, by receiving the braking oil pressure generated by the pressure generating unit 130. Further, the EHB system including isolated circuits according to the exemplary embodiment of the present invention includes oil supply lines 141a and 141b connecting the pressure generating unit 130 and the wheel clamping units 160a, 160b, 160c, and 160d to supply the braking oil pressure generated by the pressure generating unit 130 to the respective wheel clamping units 160a, 160b, 160c, and 160d, and oil return lines 150a and 150b for making oil return to an oil reservoir 110.

The EHB system including isolated circuits including the aforementioned configurations is generally controlled by a control unit 170, and the control unit 170 controls driving of the pressure generating unit 130 and opening/closing of various valves within the system to generate target braking force according to a braking input of the driver.

The configuration of the EHB system will be described in more detail. First, the EHB system includes the oil reservoir 110 storing braking oil, a backup master cylinder 122 connected to the oil reservoir 110 and generating oil pressure when the driver pressurizes the brake pedal 121 (that is, a pedal effort of the driver is applied to the brake pedal), and a pedal simulator 124 connected with the backup master cylinder 122 through the pedal hydraulic line 123 and providing a pedal feel according to the pedal effort of the driver by the oil pressure generated by the backup master cylinder 122. The backup master cylinder 122 is connected to the oil supply lines 141a and 141b through cut valves 142a and 142b that are normally open valves.

The pressure generating unit 130 of the EHB system according to the present invention is configured to provide braking oil pressure to the oil supply lines 141a and 141b according to an operation signal of the control unit 170. For example, as illustrated in FIG. 4, the pressure generating unit 130 may be formed of a pump driven by the motor 132, and an operation of the pump is controlled by the control unit 170.

That is, the control unit 170 makes a piston 134 move in front and rear directions within a cylinder 135 by controlling the driving of the motor 132 to control the generation of the oil pressure.

The cylinder 135 of the pressure generating unit 130 is connected with the oil supply lines 141a and 141b for supplying oil pressure to the wheel clamping units and the oil return lines 150a and 150b for returning oil to the oil reservoir.

Release valves 143a and 143b are installed in the oil supply lines 141a and 141b connected to the wheel clamping units of the vehicle wheels, respectively, and the oil supply lines 141a and 141b installed with the release valves 143a and 143b are connected with the wheel clamping units of the vehicle wheels through inlet valves 145a, 145b, 145c, and 145d, respectively, so as to supply the oil pressure generated by the pressure generating unit 130.

Pressure sensors 180a and 180b for detecting oil pressure may be installed in the oil supply lines 141a and 141b connected to the inlet valves 145a, 145b, 145c, and 145d. The pressure sensor may detect oil leakage due to generation of leakage of the oil supply lines 141a and 141b.

The oil return lines 150a and 150b branched from the oil supply lines 141a and 141b connected to the wheel clamping units 160a, 160b, 160c, and 160d of the vehicle wheels are connected to the oil reservoir 110 through outlet valves 146a, 146b, 146c, and 146d.

In the meantime, the EHB system including isolated circuits according to the present invention is characterized in that two or more oil supply lines 141a and 141b are formed. The two or more oil supply lines may be physically divided. By forming the two or more independent oil supply lines as described above, even though oil leaks due to the generation of the leakage of the partial oil supply line, it is possible to completely isolate the oil supply line, in which oil leaks, from the oil supply line, in which oil leakage is not generated.

The oil return lines having the number corresponding to the number of oil supply lines are configured to be connected to the oil reservoir 110, and the oil return lines 150a and 150b are configured to be isolated from each other.

The oil return line corresponding to each oil supply line forms one oil circulation loop as illustrated in FIG. 4, and the oil circulation loop is referred to as a "circuit" in the present specification. In the exemplary embodiment of the present invention, it is characterized that each circuit is isolated.

Particularly, the oil return lines 150a and 150b are not connected with each other as in the related art of FIG. 1, but formed as isolated or separated flow paths. That is, similar to the operation of the ABS, when an oil pressure of the wheel clamping unit is released, oil of each circuit returns to the oil reservoir 110 through the isolated oil return lines 150a and 150b. In the meantime, the oil supply lines are connected to the pressure generating unit 130 as illustrated in FIG. 4, so that the oil supply lines are indirectly connected through the flow path of the pressure generating unit 130. However, in the EHB system including isolated circuits according to the present invention, split valves 144a and 144b are installed on connection portions connecting the pressure generating unit 130 and the oil supply lines, respectively, in order to isolate the oil supply lines.

Accordingly, when oil leaks in some circuits, the spilt valves 144a and 144b are closed through the control unit 170, so that the oil supply line, in which the oil leaks, may be isolated.

In the meantime, in the exemplary embodiment of the present invention, a plurality of partition walls for dividing an inner side of the oil reservoir 110 may be formed.

The partition wall is for the purpose of preventing the return oil from being mixed within the oil reservoir 110, and each circuit may secure a minimum level of oil quantity by the partition wall.

That is, each partition wall is formed with a height capable of securing a minimum level of oil quantity for securing braking stability in each circuit. Accordingly, even though oil is continuously supplied to a circuit, in which oil leaks, through the oil reservoir 110 after the oil leaks in the partial circuit, the normal circuit may secure a predetermined level of oil quantity.

The partition walls may include a first partition wall 111 for dividing the oil reservoir 110 to have a chamber corresponding to each circuit, and second partition walls 112a and 112b for dividing the regions divided by the first partition wall 111 into regions connected to the oil supply lines 141a and 141b and the oil return lines 150a and 150b.

For example, as illustrated in FIG. 4, the first partition wall 111 is formed inside the oil reservoir 110 so as to divide the oil reservoir 110 into regions corresponding to the number of oil supply lines. Accordingly, the region of the oil reservoir corresponding to each circuit is divided through the first partition wall 111.

The internal regions of the oil reservoir divided by the first partition wall 111 are re-divided by the second partition walls 112a and 112b. In this case, the re-divided regions are connected to the oil supply lines 141a and 141b and the oil return lines 150a and 150b, respectively.

Accordingly, through the aforementioned configuration, in order to prevent a braking failure due to insufficient oil when oil leaks in some circuits, the EHB system including isolated circuits according to the exemplary embodiment of the present invention is configured to isolate the oil return lines 150a and 150b that are the ABS pressure release flow paths at the wheel clamping side, from each other, and completely isolate the respective circuits by installing the split valves 144a and 144b on the connection portions with the pressure generating unit 130.

In the exemplary embodiment of the present invention, the plurality of partition walls is installed inside the oil reservoir 110, so that even though oil leakage is not detected, it is possible to secure a minimum oil quantity for a circuit, in which oil leakage is not generated.

In the above, the configuration of the EHB system including isolated circuits according to the present invention has been described, and a method of controlling the EHB system including isolated circuits according to the present invention and an operation state thereof will be described.

FIGS. 5 and 6 illustrate operation states of the EHB system according to FIG. 4. Particularly, FIG. 5 illustrates a normal operation state, and FIG. 6 illustrates an operation state when oil leaks in one circuit.

In a normal operation state, as illustrated in FIG. 5, when a pedal input is made by a driver, braking oil pressure is generated by the pressure generating unit 130 in a state where the cut valves 142a and 142b are closed. In this case, all of the split valves 144a and 144b are in the opened state, so that the braking oil pressure is normally supplied to the wheel clamping units through the oil supply lines 141a and 141b, respectively.

By contrast, as illustrated in FIG. 6, when oil leaks in one circuit and the oil leakage is detected, the control unit 170 prevents the braking oil pressure from being transferred to the circuit, in which the oil leaks, by closing the split valve 144a at the circuit side in which oil leaks.

Accordingly, the braking oil pressure is supplied only to the normal oil supply line 141b indicated by a black line in FIG. 6, and braking force may be sufficiently secured by using the pressure generating unit and the normal circuit. In this case, since the oil return line 150a of the circuit having a failure is separated from the oil return line 150b of the normal circuit, even though the ABS is operated, it is possible to prevent oil between the respective circuits from being mixed.

Even though the oil leakage is not detected, regardless of whether the oil of the circuit is completely exhausted, in which oil leaks, through the four divided partition regions, the normal circuit may sufficiently secure an oil quantity.

The control method when oil leaks will be schematically described below.

First, oil leakage of the circuit is detected by using the pressure sensors 180a and 180b, and when the oil leakage of the circuit is detected, the control unit 170 controls the split valve 144a or 144b connecting the circuit, in which oil leaks, with the pressure generating unit 130 to be closed.

Then, braking oil pressure is generated by the pressure generating unit 130 by the control unit 170, and the generated braking oil pressure is supplied to the wheel clamping unit through the remaining normal circuit, of which the split valve is not closed, to perform braking.

In the meantime, the pressure generating unit 130 may have a failure due to insufficient oil and the like depending on a case, so that the control unit detects whether the pressure generating unit 130 has a failure, and when the failure of the pressure generating unit 130 is detected, all of the split valves 144a and 144b may be closed by the control unit 170. In this case, through the closing of the split valves 144a and 144b, the pressure generating unit is completely isolated, and braking is performed by using the pedal effort of the driver.

Accordingly, through the aforementioned control process, even though oil leaks in the circuit, it is possible to sufficiently secure braking performance by isolating the normal circuit.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents

What is claimed is:

1. An electro-hydraulic brake system including isolated circuits, comprising:
   a braking input unit configured to provide a braking input according to an operation of a driver;
   a control unit configured to control generation of braking oil pressure according to the braking input of the braking input unit;
   a pressure generating unit configured to generate the braking oil pressure and controlled by the control unit;
   wheel clamping units configured to generate braking forces to corresponding wheels; and
   two or more oil supply lines configured to transfer the braking oil pressure generated according to the braking input of the braking input unit to corresponding wheel clamping units,
   wherein each oil supply line is fluidly connected to the pressure generating unit, and
   wherein for each oil supply line, a split valve is installed in a connection portion of the pressure generating unit and the oil supply line, and when the split valve is closed, the split valve blocks the braking oil pressure supplied from the pressure generating unit to the oil supply line,
   wherein the control unit:
      detects whether oil leakage occurs within a circuit including the corresponding oil supply line, and
      controls to close the split valve installed in the connection portion of the pressure generating unit and the corresponding oil supply line, if the oil leakage occurs within the circuit.

2. The electro-hydraulic brake system of claim 1, further comprising:
   an oil reservoir configured to store braking oil, and connected to the oil supply lines to provide the braking oil to the oil supply lines.

3. The electro-hydraulic brake system of claim 2, further comprising:
   one or more first partition walls formed inside the oil reservoir to divide the oil reservoir into regions corresponding to the number of the oil supply lines; and
   two or more second partition walls to divide the regions of the oil reservoir into re-divided regions, wherein the re-divided regions are connected to the oil supply lines and oil return lines.

4. The electro-hydraulic brake system of claim 2, further comprising:
   two or more oil return lines branched from the corresponding oil supply lines, and connected with the oil reservoir to return the braking oil to the oil reservoir,
   wherein the oil return lines are isolated from each other.

5. The electro-hydraulic brake system of claim 4, wherein a respective inlet valve for blocking the supplied braking oil pressure is installed between a corresponding oil supply line and a corresponding wheel clamping unit, and a respective outlet valve for releasing the braking oil pressure is installed between a corresponding oil return line and the corresponding wheel clamping unit.

6. The electro-hydraulic brake system of claim 1, wherein the pressure generating unit includes:
   a motor, of which driving is controlled according to a control signal of the control unit; and
   a piston configured to pressurize the braking oil within a cylinder by using rotating force of the motor.

7. The electro-hydraulic brake system of claim 1, wherein for each oil supply line, a cut valve that is a normally open valve is installed at a braking input unit side of the oil supply line.

8. The electro-hydraulic brake system of claim 7, wherein the control unit detects whether the pressure generating unit has a failure, and when the failure of the pressure generating unit is detected, the control unit controls all of the split valves to be closed in a state where the cut valve is opened.

9. A method of controlling an electro-hydraulic brake system including isolated circuits, wherein the electro-hydraulic brake system comprises two or more circuits for supplying braking oil pressure to wheel clamping units and releasing the braking oil pressure, and two or more split valves installed to block the braking oil pressure supplied from a pressure generating unit to corresponding circuits, the method comprising:
   detecting whether oil leakage occurs in a circuit in the two or more circuits;
   controlling, by a control unit, a corresponding split valve connecting the circuit, in which the oil leakage occurs, and the pressure generating unit to be closed when the oil leakage of the circuit is detected; and
   supplying the braking oil pressure generated by the pressure generating unit to the wheel clamping units through the remaining circuit or circuits in which the remaining split valve or split valves are open.

10. The method of claim 9, further comprising:
   detecting whether the pressure generating unit has a failure; and
   when it is detected that the pressure generating unit has the failure, closing, by the control unit, all of the split valves.

* * * * *

UNITED STATES PATENT AND TRADEMARK OFFICE
CERTIFICATE OF CORRECTION

PATENT NO. : 9,834,189 B2
APPLICATION NO. : 14/951452
DATED : December 5, 2017
INVENTOR(S) : Young Suk Jung Page 1 of 1

It is certified that error appears in the above-identified patent and that said Letters Patent is hereby corrected as shown below:

On the Title Page

Please insert the following missing foreign priority information:
--(30) Foreign Application Priority Data:
Jun. 23, 2015   (KR) ....................... 10-2015-0089025--.

Signed and Sealed this
Sixth Day of March, 2018

Andrei Iancu
*Director of the United States Patent and Trademark Office*